(12) United States Patent
Bochum et al.

(10) Patent No.: US 6,216,664 B1
(45) Date of Patent: Apr. 17, 2001

(54) METHOD FOR STARTING AN INTERNAL COMBUSTION ENGINE

(75) Inventors: Hansjoerg Bochum, Leinfelden; Dieter Buchholz, Sachsenheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/331,546

(22) PCT Filed: Oct. 5, 1998

(86) PCT No.: PCT/DE98/02940

§ 371 Date: Jun. 18, 1999

§ 102(e) Date: Jun. 18, 1999

(87) PCT Pub. No.: WO99/20882

PCT Pub. Date: Apr. 29, 1999

(30) Foreign Application Priority Data

Oct. 18, 1997 (DE) ............................................. 197 46 119

(51) Int. Cl.$^7$ ........................................................ F02B 5/00
(52) U.S. Cl. ............................................ 123/305; 123/435
(58) Field of Search ................................... 123/295, 305, 123/435, 491

(56) References Cited

U.S. PATENT DOCUMENTS

| 5,878,713 | * | 3/1999 | Kadota | 123/305 |
| 5,979,400 | * | 11/1999 | Nishide | 123/305 |
| 5,983,857 | * | 11/1999 | Mamiya et al. | 123/295 |
| 5,992,372 | * | 11/1999 | Nakajima | 123/305 |
| 6,006,716 | * | 12/1999 | Harada et al. | 123/305 |
| 6,029,622 | * | 2/2000 | Kadota et al. | 123/295 |
| 6,050,232 | * | 4/2000 | Grob et al. | 123/295 |
| 6,062,191 | * | 5/2000 | Ooba | 123/295 |

FOREIGN PATENT DOCUMENTS

| 0 547 649 | 6/1993 | (EP) . |
| 0 684 374 | 11/1995 | (EP) . |
| 2 310 689 | 9/1977 | (GB) . |
| 2 317 028 | 3/1998 | (GB) . |

* cited by examiner

*Primary Examiner*—John Kwon
(74) *Attorney, Agent, or Firm*—Kenyon & Kenyon

(57) ABSTRACT

An internal combustion engine in particular for a motor vehicle, which is equipped with an injection valve with which fuel can be injected either, in a first operating mode, during a compression phase or, in a second operating mode, during an intake phase, directly into a combustion chamber delimited by a piston. The internal combustion engine also has a spark plug with which the fuel injected into the combustion chamber can be ignited. A control device is present, with which the injection valve and the spark plug can be controlled. Injection of the fuel is terminated by the control device prior to ignition of the fuel. This prevents carbon deposition on the spark plug, especially when the internal combustion engine is started.

13 Claims, 4 Drawing Sheets

METHOD FOR STARTING AN INTERNAL COMBUSTION ENGINE

FIELD OF THE INVENTION

The present invention relates to a method for starting an internal combustion engine, in particular of a motor vehicle, in which fuel is injected either, in a first operating mode, during a compression phase or, in a second operating mode, during an intake phase, directly into a combustion chamber delimited by a piston; and in which the fuel injected into the combustion chamber is ignited. The present invention further relates to an internal combustion engine, in particular for a motor vehicle, having an injection valve with which fuel can be injected either, in a first operating mode, during a compression phase or, in a second operating mode, during an intake phase, directly into a combustion chamber delimited by a piston; having a spark plug with which the fuel injected into the combustion chamber can be ignited; and having a control device with which the injection valve and the spark plug can be controlled.

BACKGROUND INFORMATION

Conventional systems for the direct injection of fuel into the combustion chamber of an internal combustion engine are known. A distinction is made in this context between so-called stratified mode as a first operating mode, and so-called homogeneous mode as a second operating mode. Stratified mode is used in particular at lesser loads, while homogeneous mode is utilized when greater loads are being placed on the internal combustion engine. In stratified mode, fuel is injected during the compression phase of the internal combustion engine into the combustion chamber, specifically into the immediate vicinity of a spark plug therein. The result of this is that uniform distribution of the fuel in the combustion chamber can no longer occur. The advantage of stratified operation is that the prevailing lesser loads can be handled by the internal combustion engine with a very small mass of fuel. Greater loads cannot, however, be handled in stratified mode. In the homogeneous mode provided for greater loads of this kind, fuel is injected during the intake phase of the internal combustion engine, so that turbulence and thus mixing of the fuel in the combustion chamber can readily take place. To this extent, homogeneous mode corresponds approximately to the method of operation of internal combustion engines in which fuel is injected in conventional fashion into the intake manifold.

In both operating modes, i.e. in stratified mode and in homogeneous mode, the injection angle and injection time of the fuel being injected are controlled in closed-loop and/or open-loop fashion by a control device, as a function of a plurality of parameters, to a value that is optimum in terms of fuel economy, emissions reduction, and the like.

For starting, the internal combustion engine is operated in homogeneous mode. Fuel is thus injected into the combustion chamber during the intake phase. The injection angle and the injection time during which fuel is injected are calculated by the control device prior to the intake phase. This calculation is performed in real time, i.e. on the basis of the operating state of the internal combustion engine existing prior to the intake phase.

During starting, the internal combustion engine is accelerated very rapidly. The result of this can be that the previously calculated injection angle and/or the previously calculated injection time no longer correspond, at the time of the actual injection action, to the operating state of the internal combustion engine existing at that time.

It is thus possible, for example, for the injection time to have been calculated for a low engine speed, but for the engine speed then to increase, because of the acceleration during starting, in such a way that the injection time is now too long. The result of this can be that fuel is still being injected into the combustion chamber, and the injection valve is thus still open, while the injected fuel is already being ignited by the spark plug. This causes premature carbon deposition on the injection valve, and is thus undesirable.

It is furthermore possible, because of the increase in engine speed during starting, for the injection valve still to be open even when the compression generated by the piston is already greater than the injection pressure that is being exerted on the fuel being injected. The result of this is then that a fuel-air mixture can be blown back out of the combustion chamber into the injection valve and thus into the fuel conditioning system. This causes subsequent misfires and the like during operation of the internal combustion engine.

It is the object of the present invention to create a method for operating an internal combustion engine with which the internal combustion engine can be more easily started.

SUMMARY OF THE INVENTION

This object is achieved by a method and combustion engine according to the present invention by the fact that injection of the fuel is terminated prior to ignition of the fuel.

This ensures that the injection valve is always closed when the fuel is ignited by way of the spark plug. Premature carbon deposition of the injection valve is thus reliably prevented. The operability and service life of the injection valve are thereby substantially increased.

In one embodiment of the present invention, injection of the fuel is terminated at a predefined angular position prior to ignition of the fuel. This angular position is precalculated and selected in such a way that in all circumstances it is located prior to ignition of the fuel. This on the one hand ensures that in all circumstances, the injection valve is closed when the fuel is ignited. On the other hand, this embodiment has the advantage that only at the aforesaid angular position is it necessary for the control device to perform an action, namely to command the injection valve into its closed state if it is still open. Further actions, in particular monitoring of the angular position at regular time intervals, are not necessary.

It is also advantageous if injection of the fuel is terminated, at the latest, at for example approximately 290 degrees past the top dead center point of the relevant piston. The top dead center point of a piston in a cylinder is measured using associated sensors. It is thus possible, based on the top dead center point after the intake phase, to indicate the angular position at which the injection valve is to be closed. The angular position of approximately 290 degrees past the top dead center point after the intake phase represents a value at which ignition of the fuel in the combustion chamber is in no circumstances yet taking place.

In another embodiment of the present invention, injection of the fuel is terminated at a predefined temporal or angular interval prior to ignition of the fuel. For example, as soon as the interval between the actual angular position of the internal combustion engine and the precalculated angular position provided for ignition falls below a specific limit value, if fuel is still being injected into the combustion chamber, the injection valve is closed. The result is that fuel is always injected up until the maximum possible angular position, but that in all circumstances, the injection valve is nevertheless closed when the fuel is ignited. With this embodiment it is necessary, however, to measure or calculate the current angular position of the internal combustion engine at frequent intervals.

In another embodiment of the present invention in which the pressure exerted on the fuel being injected is measured, the pressure existing in the combustion chamber is ascertained, and injection of the fuel is terminated before or as soon as the pressure in the combustion chamber becomes greater than the pressure exerted on the fuel.

The injection valve is closed no later than the point in time at which the pressure in the combustion chamber becomes greater than the pressure exerted on the fuel. The result is that fuel-air mixture cannot be blown back out of the combustion chamber into the injection valve. The operability of the fuel conditioning system is thus maintained, and misfiring of the internal combustion engine or the like is prevented. It is necessary with this development, however, to measure or calculate the pressure exerted on the fuel, and the pressure in the combustion chamber, at frequent intervals.

In a further advantageous development of the present invention, injection of the fuel is terminated at a predefined angular position. This angular position is precalculated and selected in such a way that in all circumstances, the injection valve is closed when the pressure in the combustion chamber becomes greater than the pressure exerted on the fuel. This on the one hand ensures that the injection valve is definitely closed before a fuel/air mixture can be blown back out of the combustion chamber into the injection valve. On the other hand, this embodiment has the advantage that only at the aforesaid angular position is it necessary for the control device to perform an action, namely to command the injection valve into its closed state if it is still open. Further actions, in particular monitoring of the angular position at regular time intervals, are not necessary.

It is particularly advantageous if injection of the fuel is terminated approximately at the bottom dead center point of the relevant piston. With this angular position, malfunction can be reliably prevented.

Implementing the method according to the present invention in the form of an electrical storage medium that is provided for a control device of an internal combustion engine, in particular of a motor vehicle, is of particular significance. A program that can execute on a computing device, in particular on a microprocessor, and is suitable for carrying out the method according to the present invention, is stored on the electrical storage medium. In this case the present invention is thus implemented by way of a program stored on the electrical storage medium, so that this storage medium equipped with the program represents the present invention in the same way as the method for whose implementation the program is suitable.

DETAILED DESCRIPTION

Figure 1:
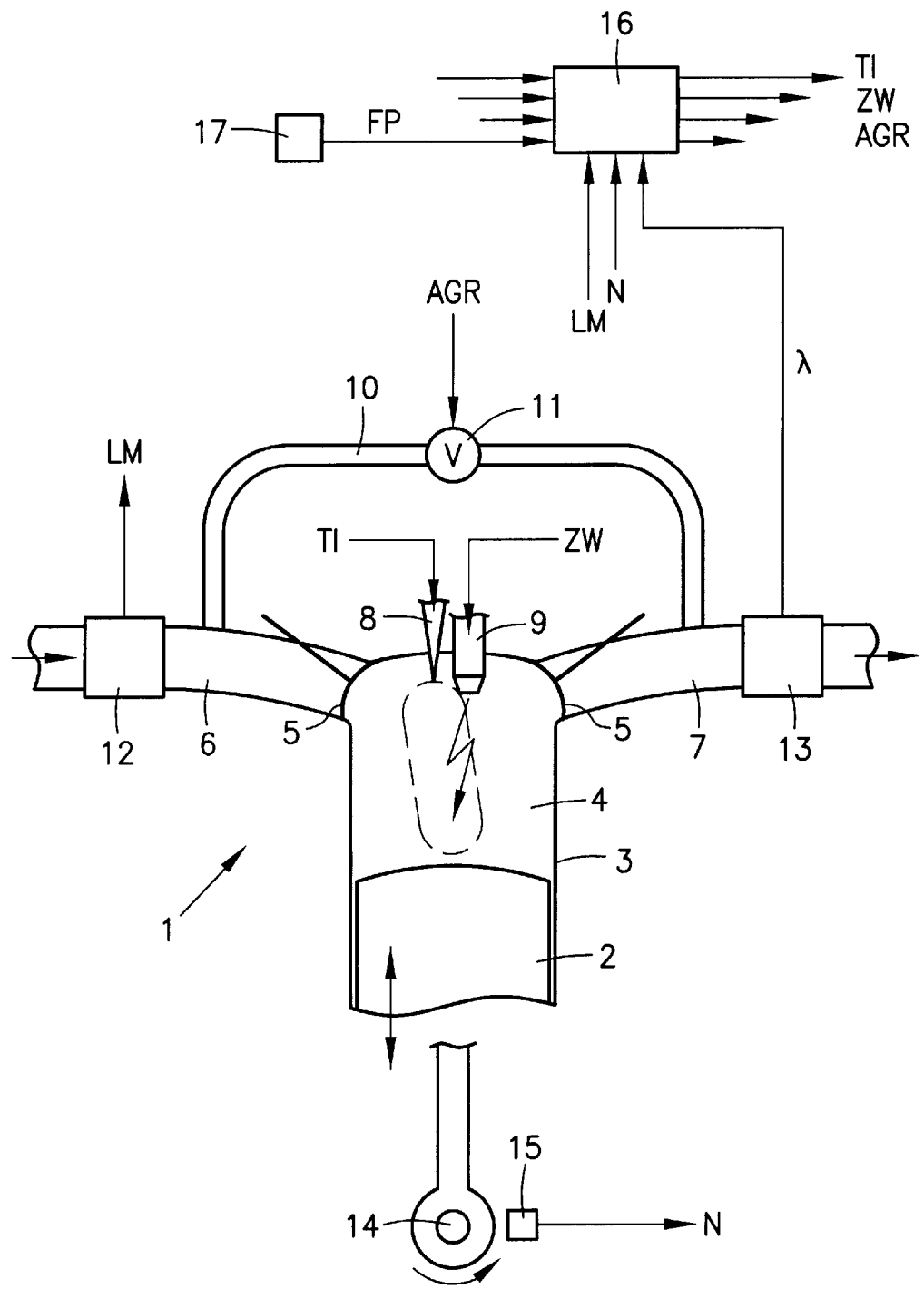
FIG. 1 shows a schematic block diagram of an exemplary embodiment of an internal combustion engine of a motor vehicle according to the present invention.

FIG. 1 shows an internal combustion engine 1 in which a piston 2 can move back and forth in a cylinder 3. Cylinder 3 is equipped with a combustion chamber 4 to which an intake manifold 6 and an exhaust manifold 7 are connected via valves 5. Also associated with combustion chamber 4 are an injection valve 8 that can be activated with a signal TI, and a spark plug 9 that can be activated with a signal ZW. Exhaust manifold 7 can be connected to intake manifold 6 via an exhaust gas recirculation line 10 and an exhaust gas recirculation valve 11 that can be controlled with a signal AGR.

Intake manifold 6 can be equipped with an air mass sensor 12, and exhaust manifold 8 with a lambda sensor 13. Air mass sensor 12 measures the oxygen mass in the fresh air conveyed to intake manifold 6, and generates a signal LM as a function thereof. Lambda sensor 13 measures the oxygen content of the exhaust gas in exhaust gas manifold 7, and generates a signal $\lambda$ as a function thereof.

In a first operating mode (stratified mode) of internal combustion engine 1, fuel is injected by injection valve 8, during a compression phase brought about by piston 2, into combustion chamber 4, specifically locally into the immediate vicinity of spark plug 9 and temporally immediately before the top dead center point of piston 2. The fuel is then ignited with the aid of spark plug 9, so that piston 2 is driven by the expansion of the ignited fuel in the power phase which then follows.

In a second operating mode (homogeneous mode) of internal combustion engine 1, fuel is injected into combustion chamber 4 by injection valve 8 during an intake phase brought about by piston 2. The injected air is made turbulent by the air that is simultaneously drawn in, and thus distributed substantially uniformly in combustion chamber 4. The fuel-air mixture is then compressed during the compression phase so as then to be ignited by spark plug 9. Piston 2 is driven by the expansion of the ignited fuel.

In stratified mode and in homogeneous mode, the driven piston imparts to crankshaft 14 a rotary motion by which the wheels of the motor vehicle are ultimately driven. Associated with crankshaft 14 is a rotation speed sensor 15 which generates a signal N as a function of the rotary motion of crankshaft 14.

In stratified mode and in homogeneous mode, the fuel is injected at high pressure via injection valve 8 into combustion chamber 4. An electric fuel pump and a high-pressure pump are provided for this purpose; the latter can be driven either by internal combustion engine 1 or by an electric motor. The electric fuel pump generates a so-called rail pressure EKP of at least 3 bar, and the high-pressure pump generates a rail pressure HD of approximately 100 bar.

The fuel mass injected by injection valve 8 into combustion chamber 4 in both stratified mode and homogeneous mode is controlled in closed-loop and/or open-loop fashion by a control device 16, in particular in terms of low fuel consumption and/or low emissions generation. For this purpose, control device 16 is equipped with a microprocessor which has stored in a storage medium, in particular in a read-only memory, a program which is suitable for performing the aforesaid closed-loop and/or open-loop control function.

Control device 16 is acted upon by input signals which represent operating variables of the internal combustion engine measured by way of sensors. Control device 16 is connected, for example, to air mass sensor 12, lambda sensor 13, and rotation speed sensor 15. Control device 16 is also connected to an accelerator pedal sensor 17 which generates a signal FP indicating the position of an accelerator pedal that can be actuated by a driver. Control device 16 generates output signals with which, via actuators, the behavior of the internal combustion engine can be influenced in accordance with the desired closed-loop and/or open-loop control system. For example, control device 16 is connected to injection valve 8, spark plug 9, and exhaust gas recirculation valve 11, and generates signals TI, ZW, and AGR necessary for activating them.

Injection of the fuel to be injected into the combustion chamber is controlled using signal TI. This injection action is made up of an injection angle at which injection begins, and the injection time which defines the temporal length of the injection action. In homogeneous mode, the injection angle and injection time are each calculated prior to the intake phase by control device 16, based on the calculation time required therefor. Control device 16 uses as the basis for this calculation the operating state of the internal combustion engine prevailing at that point in time, i.e. prior to the intake phase.

When internal combustion engine 1 is started, it is operated in homogeneous mode. The injection angle and the injection time are calculated by control device 16 prior to the intake phase. During the intake phase, injection of the fuel into combustion chamber 4 of internal combustion engine 1 then takes place. Shortly before the top dead center point of piston 2 between the compression and power phases, the fuel is ignited by spark plug 9.

Figure 3A:
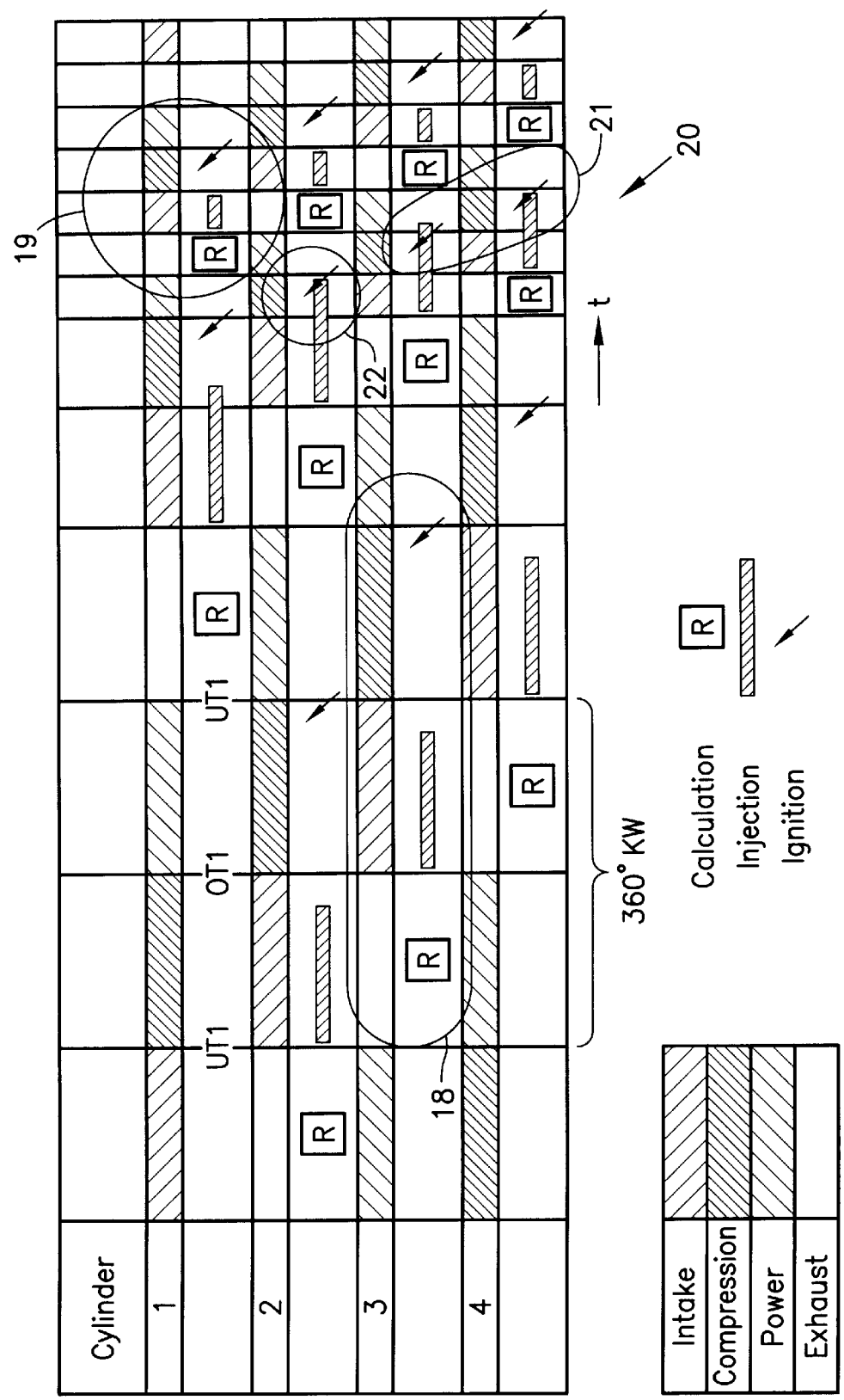
FIG. 3a shows a first schematic time diagram for operating the internal combustion engine illustrated in FIG. 1.

FIG. 3a depicts starting of an internal combustion engine 1 according to the existing art. In FIG. 3a, the operating sequence for each of the four cylinders 3 of internal combustion engine 1 is plotted against time t. The vertical lines represent bottom and top dead center points of pistons 2, the bottom dead center point UT1 and top dead center point OT1 of the first cylinder being labeled by way of example. Each two top or bottom dead center points are separated by 360 degrees of crank angle CA.

The different spacings between the vertical lines in the direction of the time axis indicate the acceleration of internal combustion engine 1 during starting. Whereas engine speed N is initially still low and the time required for one angular rotation of, for example, 180 degrees CA is still long, at a later point in time engine speed N is already substantially greater and the time required for the same angular rotation is already substantially shorter.

As mentioned, the injection of fuel into combustion chamber 4 is calculated in advance by control device 16. The basis for this is the current operating state of internal combustion engine 1 at the time of the calculation. This means in particular that the injection angle and injection time are calculated in such a way that the injection action can be accomplished within the intake phase. A prerequisite for this, however, is that engine speed N of internal combustion engine 1 changes only within a range that can occur only during normal or usual accelerations of internal combustion engine 1.

Injection actions of this kind are labeled in FIG. 3a, by way of example, with reference numbers 18 and 19.

During starting, internal combustion engine 1 is accelerated very rapidly. This acceleration results in changes in engine speed N which no longer meet the above described prerequisite. The result of this is that the injection angle and the injection time—which, as mentioned, were calculated on the basis of the current operating state of internal combustion engine 1 present at the time of calculation, and thus on the basis of engine speed N existing at that point in time—are no longer appropriate for the substantially higher engine speed N existing during the injection action. In particular, the injection time is so long that the injection action extends beyond the intake phase into the compression phase. Internal combustion engine 1 has, so to speak, "run into" the injection action. Such is the case with the injection actions labeled with reference character 20 in FIG. 3a.

The result of this can be that injection valve 8 is still open when the fuel in combustion chamber 4 is already being ignited by spark plug 9. Injection actions of this kind are labeled in FIG. 3a with the reference number 21.

Another result of this can be that the fuel-air mixture is blown back out of combustion chamber 4 into injection valve 8. An injection action of this kind is labeled in FIG. 3a with reference number 22.

Lastly, a result of this can be that the fuel conditioning system is not yet fully operational during starting. The fuel conditioning system comprises in particular the electric fuel pump and the high-pressure pump. Since the high-pressure pump is not yet generating any appreciable pressure shortly after internal combustion engine 1 is started, the electric fuel pump is exerting, at most, rail pressure EKP on the fuel. This pressure is a maximum of approximately 3.5 bar. The result of this can be that during the compression phase, the compression generated by piston 2 in combustion chamber 4 becomes greater than the pressure exerted by the fuel conditioning system on the fuel that is to be injected. If this situation occurs, the fuel-air mixture is, as mentioned, blown back out of combustion chamber 4 into injection valve 8.

Figure 3B:
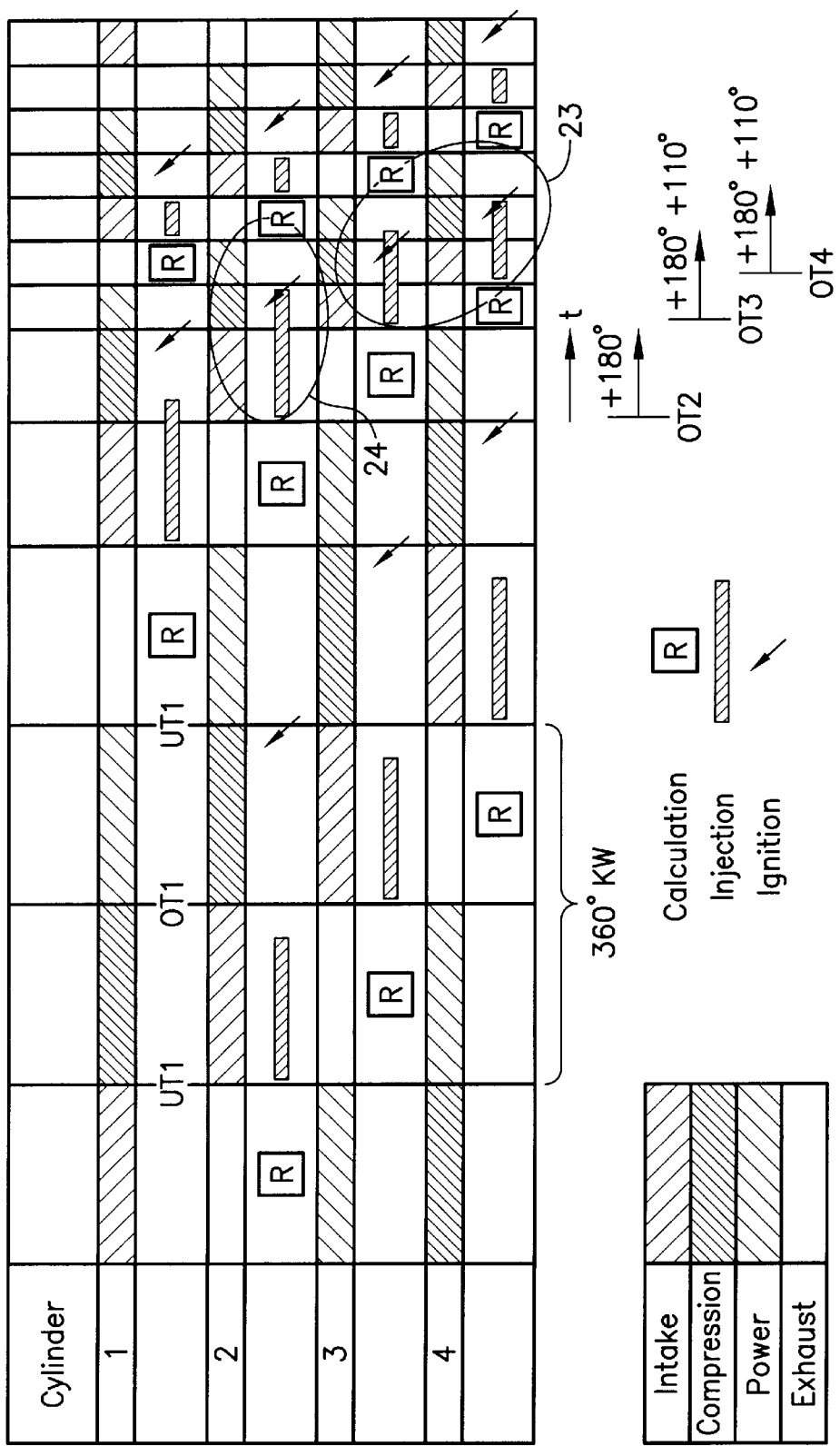
FIG. 3b shows a second schematic time diagram for operating the internal combustion engine illustrated in FIG. 1.

In FIG. 3b, starting of internal combustion engine 1 according to the present invention is depicted. FIG. 3b is largely the same as FIG. 3a, and identical features or functions are therefore labeled with identical reference characters.

Injection actions 21 of FIG. 3a are controlled differently in FIG. 3b, and are labeled therein with reference number 23. According to the present invention, these injection actions 23 of FIG. 3b are controlled by control device 16 in such a way that the injection actions of fuel into combustion chambers 4 are each terminated before the respective ignition of the fuel. This prevents injection valve 8 from still being open when the fuel is ignited.

Injection action 22 of FIG. 3a is also controlled differently in FIG. 3b, and is labeled therein with reference number 24. According to the present invention, injection action 24 in FIG. 3b is controlled by control device 16 in such a way that the injection of fuel into combustion chamber 4 is terminated when the pressure in combustion chamber 4 becomes greater than the pressure exerted on the fuel that is to be injected. This prevents a fuel-air mixture from being blown back out of combustion chamber 4 into injection valve 8.

From the signal for engine speed N, an interrupt signal is generated in control device 16 for each cylinder 3 when the respective piston 2 passes through the top dead center point OT, and when piston 2 passes through the angular position of, for example, approximately 70 degrees before the top dead center point OT. The latter angular position represents at the same time an angular position of approximately 290 degrees past the top dead center point OT.

The angular position of approximately 70 degrees before the top dead center point OT is selected so that in the compression phase, ignition of fuel in the respective combustion chamber 4 does not in any circumstances take place prior to that angular position. According to the present invention, that angular position and the associated interrupt signal are used by control device 16 in order to terminate the injection of fuel into a combustion chamber 4 that is in the compression phase, i.e. to close the corresponding injection valve 8.

If one of the pistons 2 of internal combustion engine 1 is at the bottom dead center point UT between the intake phase and compression phase, at that angular position it is guaranteed that the pressure in combustion chamber 4 is in no circumstances greater than the pressure exerted on the fuel that is to be injected. Control device 16 therefore uses that angular position to terminate the injection of fuel when it is foreseeable that at the aforesaid angular position of approximately 70 degrees before the next top dead center point OT, the pressure in combustion chamber 4 is predicted to be greater than the pressure exerted on the fuel.

Figure 2:
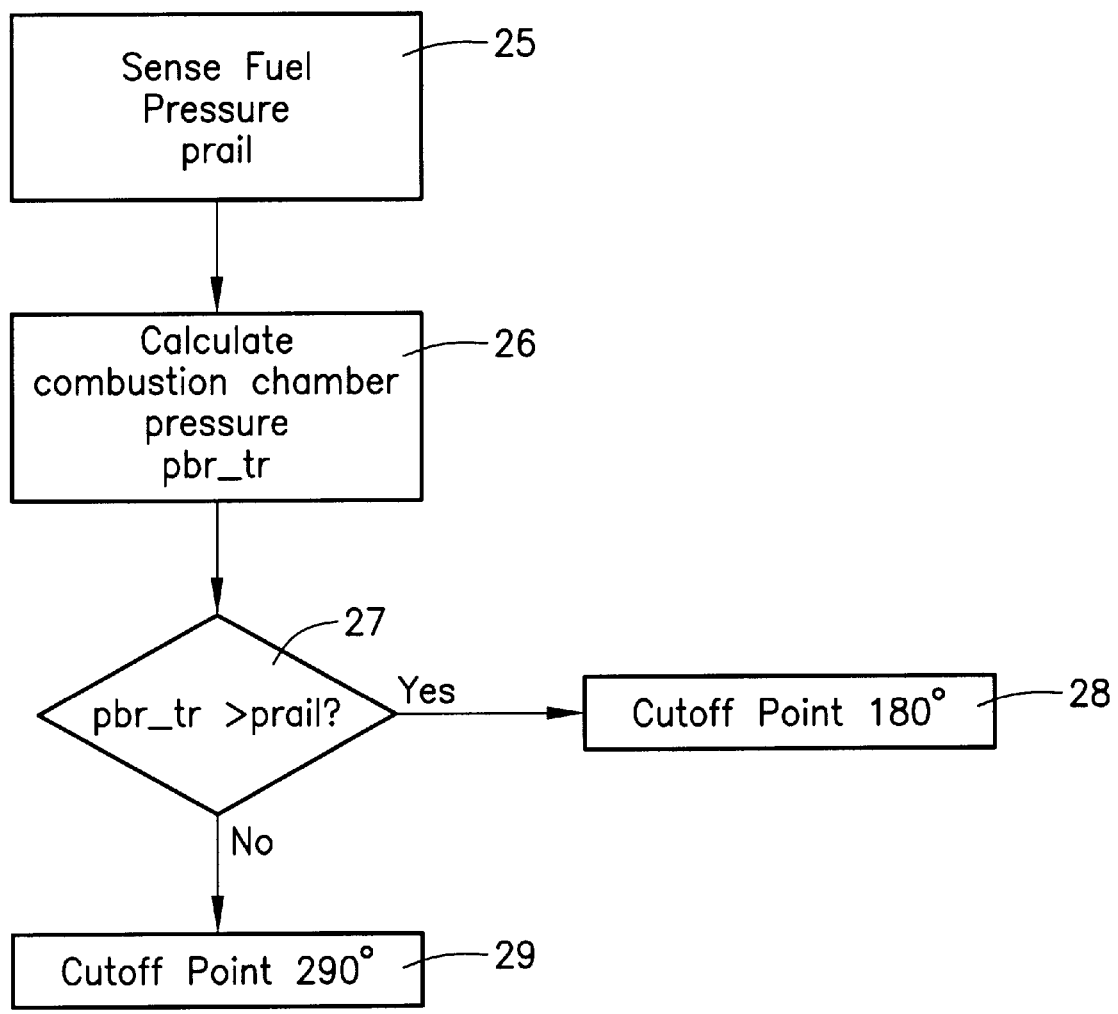
FIG. 2 shows a schematic block diagram of an exemplary embodiment of a method according to the present invention for operating the internal combustion engine illustrated in FIG. 1.

For this purpose, control device 16 performs the method depicted in FIG. 2.

The pressure prail exerted on the fuel that is to be injected is measured with the aid of a pressure sensor (block 25). A calculation is then made of the pressure pbr_tr that is predicted to be present in combustion chamber 4 at the angular position of 290 degrees past the top dead center point during the compression phase (block 26). The pressure prail exerted on the fuel is then compared to the predicted pressure pbr_tr in combustion chamber 4 (block 27).

If the predicted pressure pbr_tr is greater than pressure prail, injection of fuel is discontinued at the next bottom dead center point UT of the relevant piston 2 (block 28), i.e. at an angular position of 180 degrees past the top dead center point. Such is the case, for example, with injection action 24, in which injection valve 8 is closed after 180 degrees past OT2. As explained, this prevents the fuel-air mixture from being blown back out of combustion chamber 4 into injection valve 8.

If the predicted pressure pbr_tr is less than pressure prail, injection of fuel is discontinued at approximately 70 degrees before the next top dead center point OT (block 29), i.e. at an angular position of approximately 290 degrees past the top dead center point OT. Such is the case, for example, with injection actions 23. As explained, this prevents injection valve 8 from still being open when the fuel is ignited.

What is claimed is:

1. A method for starting an internal combustion engine, comprising the steps of:
    injecting a fuel directly into a combustion chamber which is delimited by a piston, the fuel being injected in one of:
        a first operating mode which is during a compression phase, and
        a second operating mode which is during an intake phase;
    igniting the injected fuel;
    measuring a first pressure exerted on the injected fuel;
    determining a second pressure in the combustion chamber; and
    before the igniting step, terminating an injection of the fuel into the combustion chamber no later than when the second pressure becomes greater than the first pressure.

2. The method according to claim 1, wherein the terminating step is performed at a predefined angular position.

3. The method according to claim 2, wherein the terminating step is performed at approximately 290 degrees, at most, past a top dead center point of the piston.

4. The method according to claim 1, wherein the terminating step is performed at one of a predefined temporal interval and an angular interval.

5. The method according to claim 1, wherein the injection of the fuel is terminated at a predefined angle.

6. The method according to claim 5, wherein the injection of the fuel is terminated approximately at a bottom dead center point of the piston.

7. The method according to claim 1, wherein the internal combustion engine is provided in a motor vehicle.

8. An electrical storage medium provided for a control device of an internal combustion engine, the electrical storage medium storing a program which is executable on a computing device to implement a method for starting an internal combustion engine, the method comprising the steps of:
    injecting a fuel directly into a combustion chamber which is delimited by a piston, the fuel being injected in one of:
        a first operating mode which is during a compression phase; and
        a second operating mode which is during an intake phase;
    igniting the injected fuel;
    measuring a first pressure exerted on the injected fuel;
    determining a second pressure in the combustion chamber; and
    before the igniting step, terminating an injection of the fuel into the combustion chamber no later than when the second pressure becomes greater than the first pressure.

9. The electrical storage medium according to claim 7, wherein the electrical storage medium is a read-only memory.

10. The electrical storage medium according to claim 7, wherein the internal combustion engine is provided in a motor vehicle.

11. The electrical storage medium according to claim 7, wherein the computing device is a microprocessor.

12. An internal combustion engine, comprising:
    an injection valve for injecting a fuel directly into a combustion chamber which is delimited by a piston, the fuel being injected in one of:
        a first operating mode which is during a compression phase; and
        a second operating mode which is during an intake phase;
    a spark plug for igniting the injected fuel; and
    a control device for controlling the injection valve and the spark plug, the control device measuring a first pressure exerted on the injected fuel, determining a second pressure in the combustion chamber, and terminating an injection of the fuel before the spark plug ignites the injected fuel and no later than when the second pressure becomes greater than the first pressure.

13. The internal combustion engine according to claim 12, wherein the internal combustion engine is provided in a motor vehicle.

* * * * *